(12) United States Patent
Hymel

(10) Patent No.: US 9,411,486 B2
(45) Date of Patent: Aug. 9, 2016

(54) SYSTEM AND METHOD FOR PROVIDING SECONDARY CONTENT USING A COLOUR CONTROLLER

(71) Applicant: BlackBerry Limited, Waterloo (CA)

(72) Inventor: James Allen Hymel, San Jose, CA (US)

(73) Assignee: BlackBerry Limited, Waterloo, CA (US)

( * ) Notice: Subject to any disclaimer, the term of this patent is extended or adjusted under 35 U.S.C. 154(b) by 108 days.

(21) Appl. No.: 14/524,292

(22) Filed: Oct. 27, 2014

(65) Prior Publication Data

US 2015/0046868 A1 Feb. 12, 2015

Related U.S. Application Data

(63) Continuation of application No. 13/044,639, filed on Mar. 10, 2011, now Pat. No. 8,881,042.

(51) Int. Cl.
*G06F 3/048* (2013.01)
*G06F 3/0481* (2013.01)
*G06Q 30/02* (2012.01)
*G06F 3/0484* (2013.01)

(52) U.S. Cl.
CPC ............ *G06F 3/0481* (2013.01); *G06F 3/0484* (2013.01); *G06Q 30/0241* (2013.01); *G09G 2340/145* (2013.01)

(58) Field of Classification Search
CPC ........... G09G 2340/145; G06F 3/0481; G06Q 30/241
USPC ......... 715/764, 772, 778, 781, 788, 795, 808, 715/809; 707/754; 713/154; 726/4, 26, 27
See application file for complete search history.

(56) References Cited

U.S. PATENT DOCUMENTS

| | | |
|---|---|---|
| 7,530,086 B2 | 5/2009 | Brassil |
| 7,583,793 B2 | 9/2009 | Jacovi et al. |
| 7,770,109 B2 | 8/2010 | Fortes |
| 7,792,846 B1 | 9/2010 | Raffill et al. |
| 7,797,168 B2 | 9/2010 | Kusumoto et al. |
| 2005/0154796 A1 | 7/2005 | Forsyth |
| 2007/0130003 A1 | 6/2007 | Davis et al. |
| 2008/0109842 A1 | 5/2008 | Wachtfogel et al. |

(Continued)

OTHER PUBLICATIONS

Partial European Search Report dated Aug. 17, 2011, issued by the European Patent Office for corresponding European Patent Application No. 11157712.8.

(Continued)

*Primary Examiner* — Haoshian Shih
(74) *Attorney, Agent, or Firm* — Moffat & Co.

(57) ABSTRACT

A method of providing secondary content on a mobile device such that the secondary content is associated with a controller and is a member of one of a plurality of content categories. The method includes displaying primary content on an interface of the mobile device; receiving the secondary content at the mobile device; applying a visual property to the controller, the visual property identifying the content category that the secondary content is a member of. Further, after receiving the secondary content at the mobile device, the controller is displayed on the interface of the mobile device such that the controller does not visually interfere with the displayed primary content. Upon receiving input selecting the controller, the secondary content associated with the controller is displayed on the interface of the mobile device.

25 Claims, 9 Drawing Sheets

(56) References Cited

U.S. PATENT DOCUMENTS

| | | |
|---|---|---|
| 2008/0160967 A1 | 7/2008 | Narasimhan et al. |
| 2008/0281677 A1 | 11/2008 | Toms et al. |
| 2009/0055254 A1 | 2/2009 | Madhavan et al. |
| 2009/0183112 A1 | 7/2009 | Higgins et al. |
| 2010/0319019 A1 | 12/2010 | Zazza |

OTHER PUBLICATIONS

Extended European Search Report dated Dec. 5, 2011, issued by the European Patent Office for corresponding European Patent Application No. 11157712.8.

Canadian Official Action dated Jan. 21, 2014, issued by the Canadian Intellectual Property Office for corresponding Canadian Patent Application No. 2,765,687.

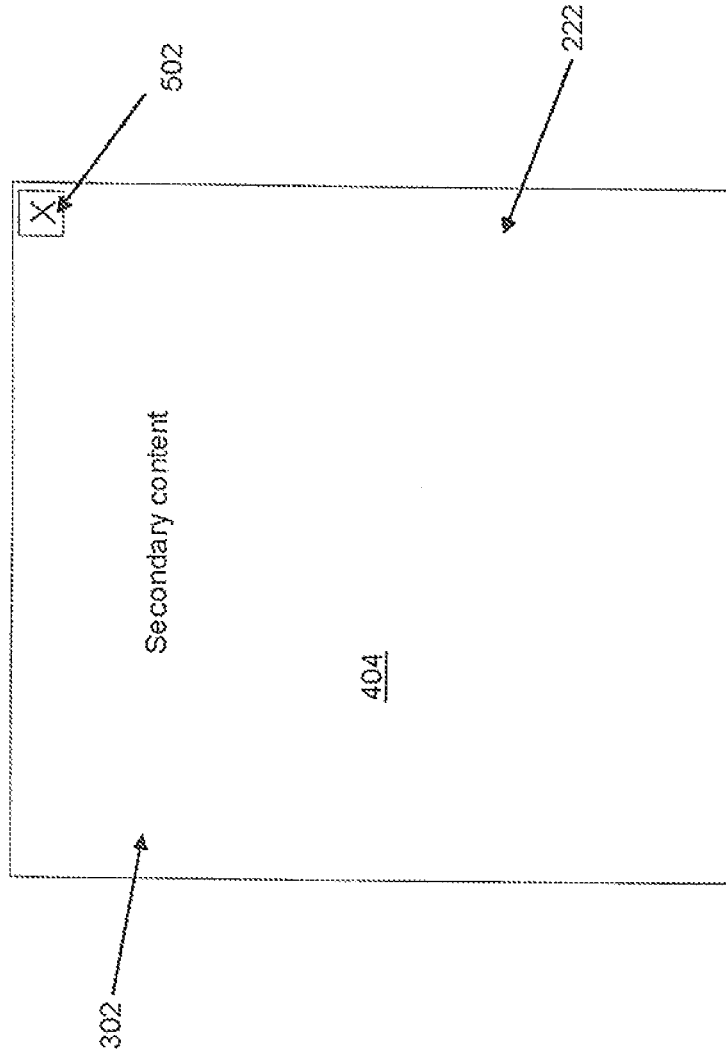

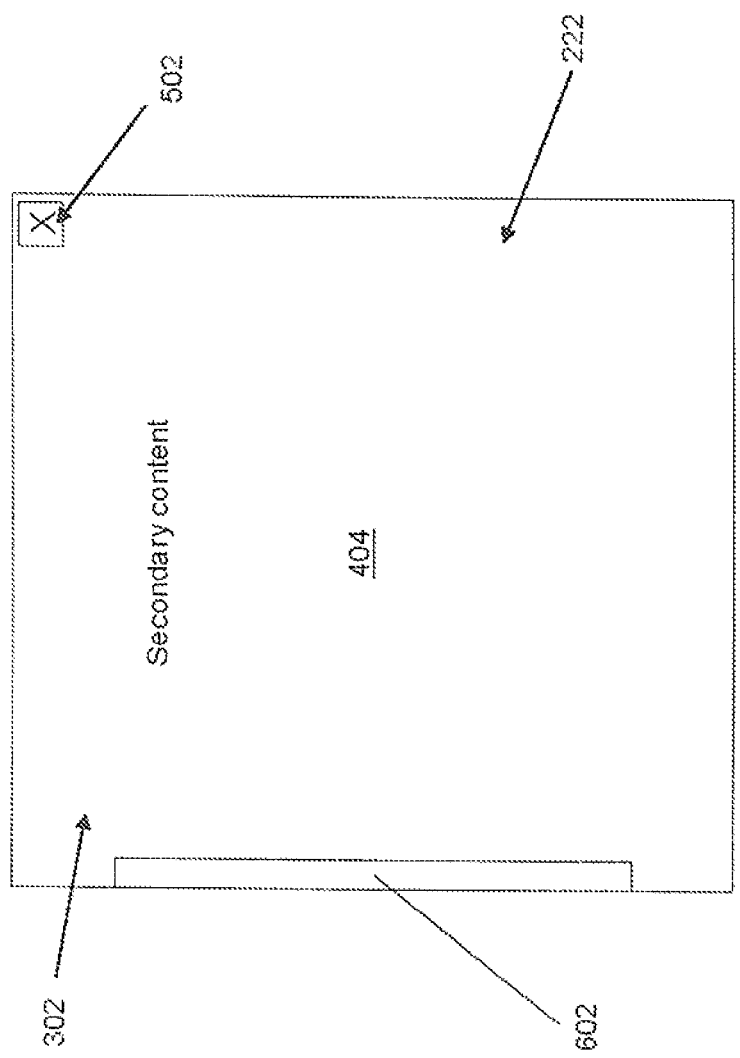

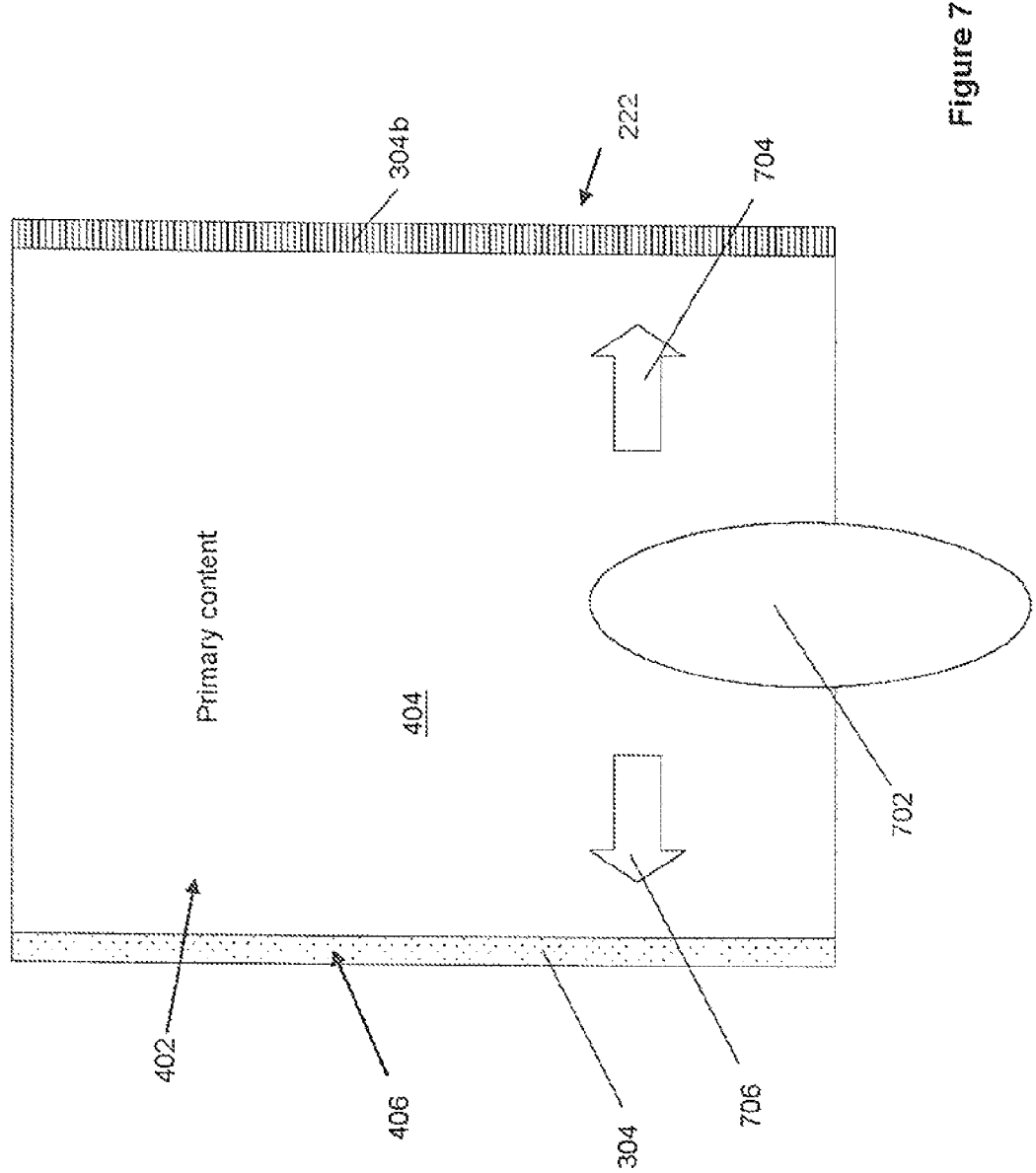

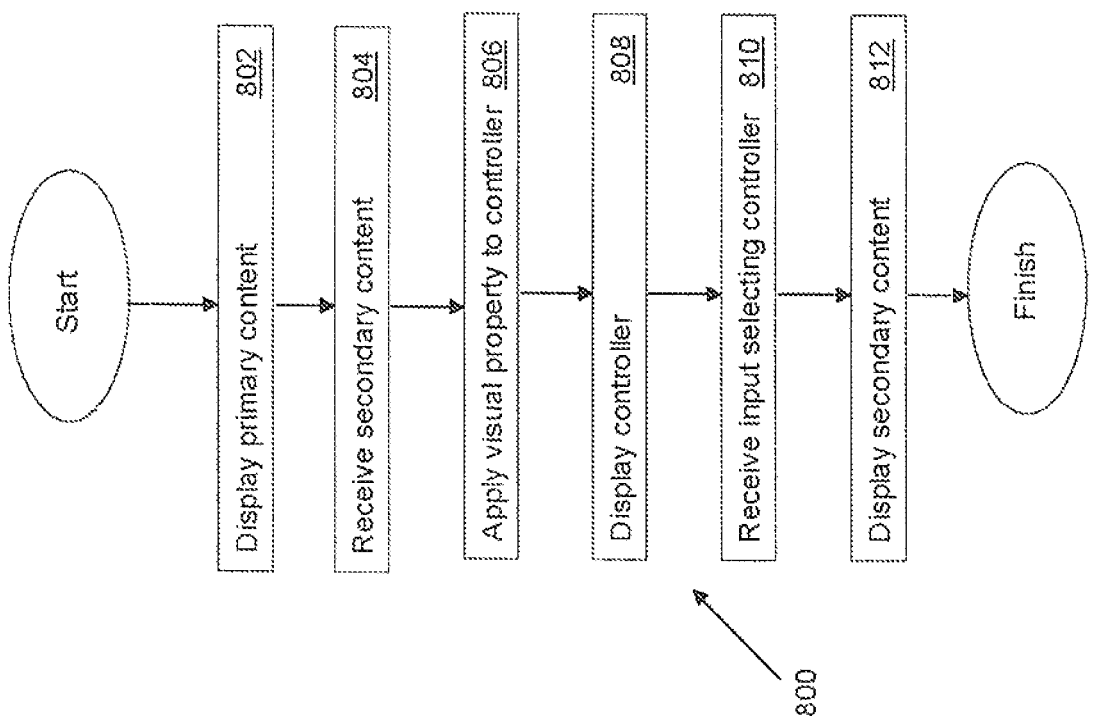

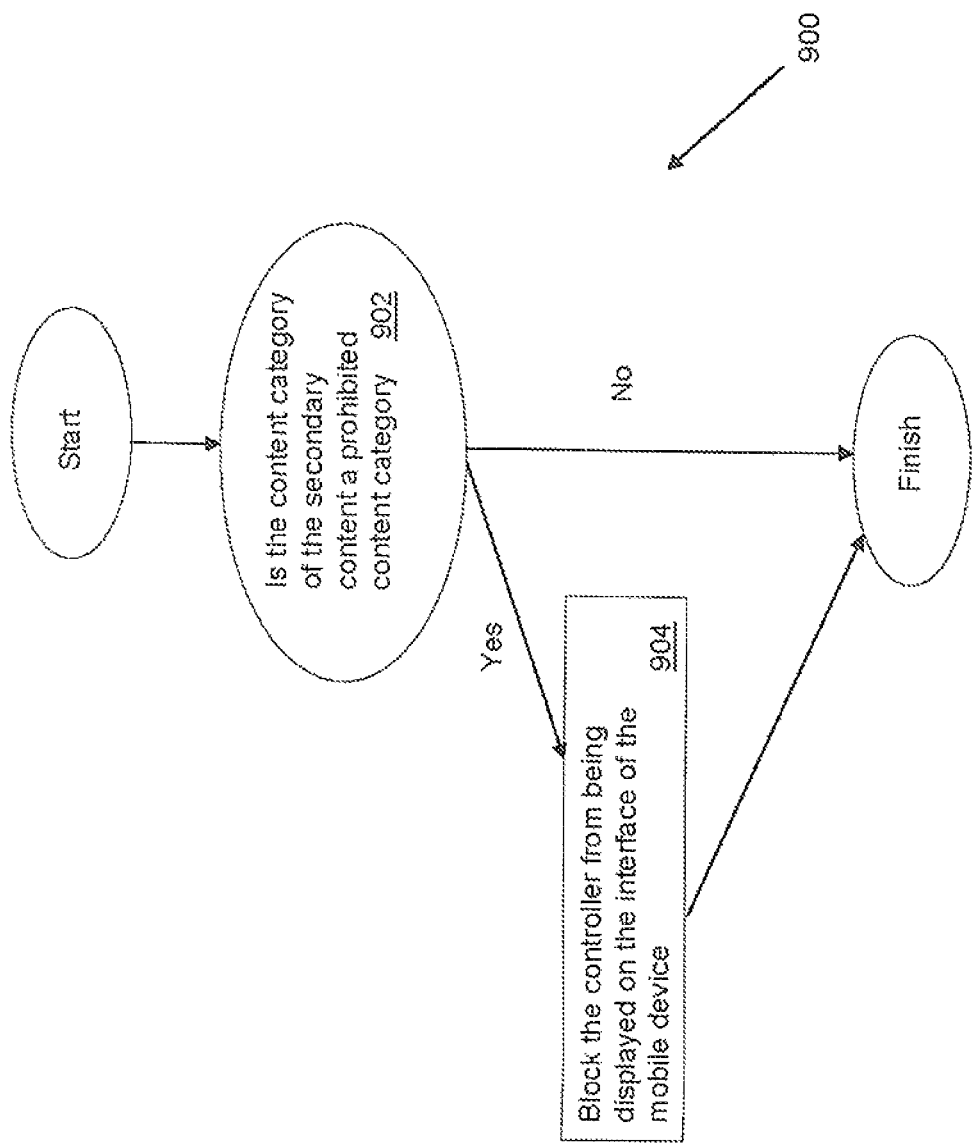

SYSTEM AND METHOD FOR PROVIDING SECONDARY CONTENT USING A COLOUR CONTROLLER

CROSS REFERENCE

The present application is a continuation of U.S. Ser. No. 13/044,639 filed Mar. 10, 2011 and entitled "System and Method For Providing Secondary Content Using a Colour Controller", the contents of which are herein incorporated by reference.

FIELD

The present matter relates to providing secondary content on a mobile device and in particular to providing secondary content on a mobile device using a controller.

BACKGROUND

Advertisements are often displayed on mobile devices. Mobile devices have limited screen sizes and thus limited real estate on an interface for displaying content. Advertisements and other content are often best viewed when displayed on the entire interface of the mobile device.

BRIEF DESCRIPTION OF THE DRAWINGS

In order that the subject matter may be readily understood, embodiments are illustrated by way of examples in the accompanying drawings, in which:

FIG. 5 is a schematic diagram illustrating another embodiment of an interface of a mobile device having secondary content displayed thereon;

FIG. 6 is a schematic diagram illustrating another embodiment of an interface of a mobile device having secondary content displayed thereon;

FIG. 7 is a screen shot shown of an embodiment of an interface;

FIG. 8 is a flowchart depicting a method for providing secondary content on a mobile device and;

FIG. 9 is a flowchart depicting additional optional steps for the method of claim 8.

DETAILED DESCRIPTION

According to an aspect, disclosed is a method of providing secondary content on a mobile device, the secondary content associated with a controller, the secondary content being a member of one of a plurality of content categories, the method comprising: displaying primary content on an interface of the mobile device; receiving the secondary content at the mobile device; applying a visual property to the controller, the visual property identifying the content category that the secondary content is a member of; after receiving the secondary content at the mobile device, displaying the controller on the interface of the mobile device such that the controller does not visually interfere with the displayed primary content; receiving input selecting the controller; and in response to receiving the input, displaying the secondary content associated with the controller on the interface of the mobile device.

According to another aspect, disclosed is a mobile device having a processor and memory, the memory storing instructions and data for execution by the processor to configure the device to display primary content on an interface of the mobile device; receive secondary content at the mobile device, the secondary content associated with a controller, the secondary content being a member of one of a plurality of content categories; apply a visual property to the controller, the visual property identifying the content category that the secondary content is a member of; after receiving the secondary content at the mobile device, display the controller on the interface of the mobile device such that the controller does not visually interfere with the displayed primary content; receive input selecting the controller; and in response to receiving the input, display the secondary content associated with the controller on the interface of the mobile device.

According to another aspect, disclosed is a computer readable medium having computer readable code embodied therein for execution by a processor for configuring a mobile device to carry out a method of providing secondary content on a mobile device, the secondary content associated with a controller the secondary content being a member of one of a plurality of content categories, the method comprising: displaying primary content on an interface of the mobile device, receiving the secondary content at the mobile device; applying a visual property to the controller, the visual property identifying the content category that the secondary content is a member of; after receiving the secondary content at the mobile device, displaying the controller on the interface of the mobile device such that the controller does not visually interfere with the displayed primary content; receiving input selecting the controller; and in response to receiving the input, displaying the secondary content associated with the controller on the interface of the mobile device.

Figure 1:
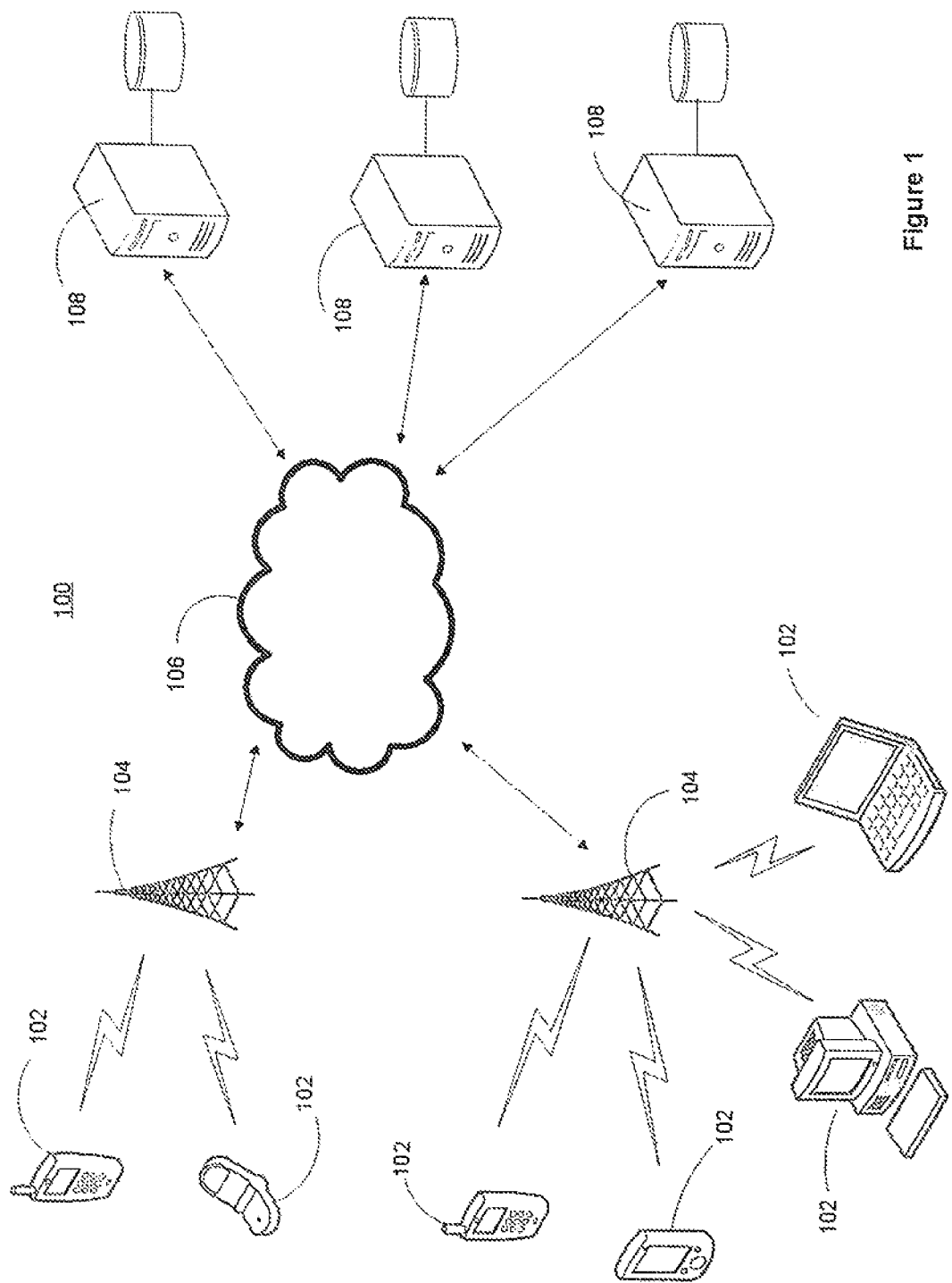
FIG. 1 is a block diagram illustrating a telecommunication infrastructure.

For convenience, like numerals in the description refer to like structures in the drawings. Referring to FIG. 1, a typical telecommunication infrastructure is illustrated generally by numeral 100. The telecommunication infrastructure 100 includes a plurality of mobile devices 102, a plurality of base stations 104, a communication network 106 and a plurality of network servers 108.

The mobile devices 102 include wireless computing devices such as a smart phone, a personal digital assistant (PDA), and the like. The mobile devices 102 are in communication with one of the base stations 104. The base stations relay data between the mobile devices 102 and the network servers 108 via the communication network 106. Accordingly, the communication network 106 may include several components such as a wireless network, a relay, a corporate server and/or a mobile data server for relaying data between the base stations 104 and the network servers 108.

The network servers 108 include servers such as a Web server, an application server, and an application server with web services. It will be appreciated by a person of ordinary skill in the art that the telecommunication infrastructure 100 described herein is example and that changes may be made to one or more components to accommodate different network configurations without affecting the scope of the aspects described herein.

Figure 2:
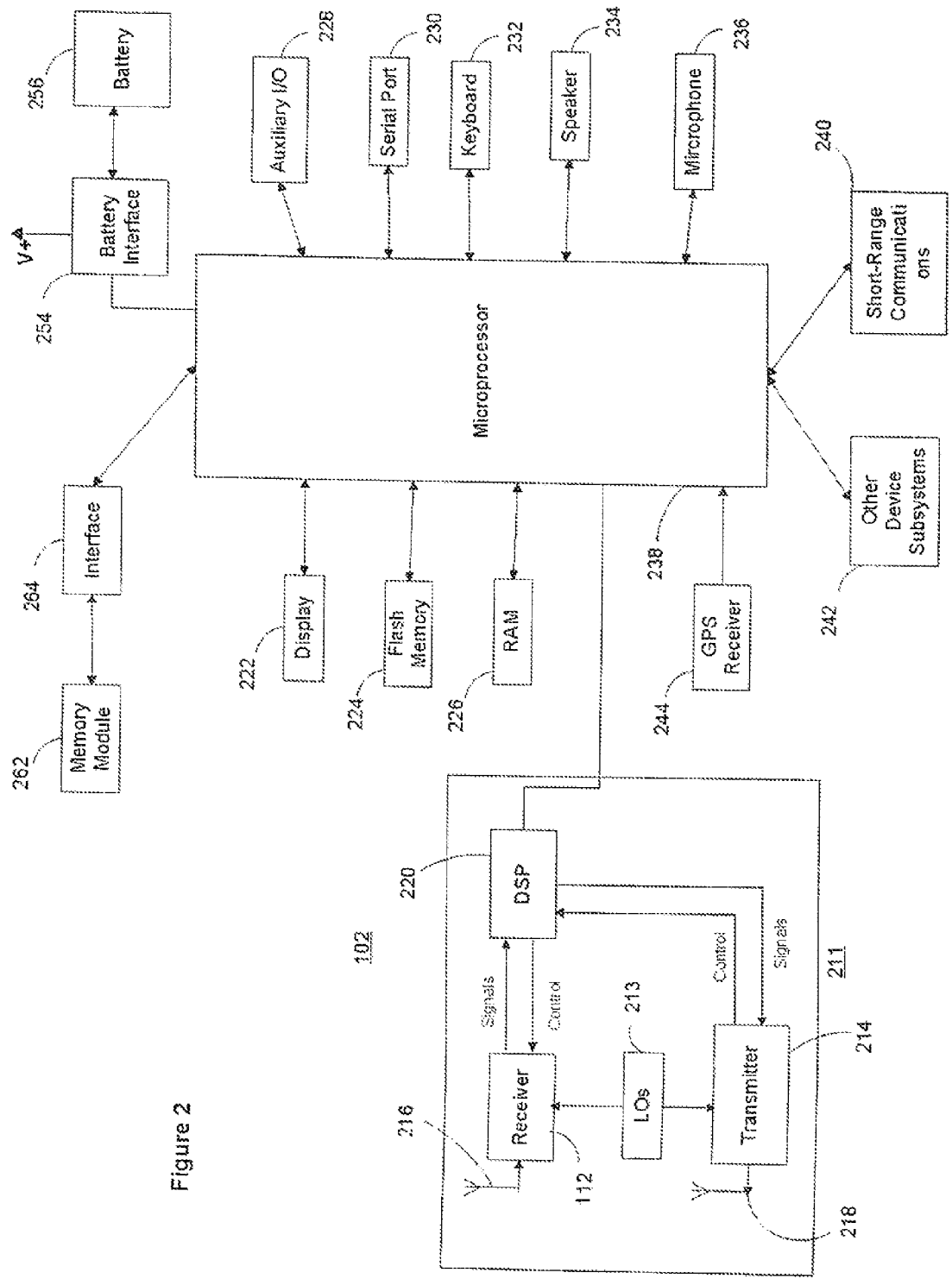
FIG. 2 is a block diagram illustrating components of a mobile device.

Referring to FIG. 2, a typical mobile device 102 is illustrated in greater detail. The mobile device 102 is often a two-way communication device having both voice and data communication capabilities, including the capability to communicate with other computer systems. Depending on the functionality provided by the mobile device 102, it may be referred to as a data messaging device, a two-way pager, a cellular telephone with data messaging capabilities, a wireless Internet appliance, or a data communication device.

The mobile device 102 includes a communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in the field of communications, the particular design of the communication subsystem 211 depends on the communication network in which mobile device 102 is intended to operate. More than one communication subsystem 211 may be incorporated or shared for communications in multiple communication networks.

The mobile device 102 includes a microprocessor 238 which controls general operation of the mobile device 102. The microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240 such as Bluetooth™ for example, and any other device subsystems or peripheral devices generally designated at 242. The mobile device 102 may also include a positioning device 244, such as a GPS receiver, for receiving positioning information.

Operating system software used by the microprocessor 238 is preferably stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, preferably enables execution of software applications on the mobile device 102. A predetermined set of applications, which control basic device operations, is installed on the mobile device 102 during its manufacture. These basic operations typically include data and voice communication applications, for example. Additionally, applications may also be loaded onto the mobile device 102 through the network 106, an auxiliary I/O subsystem 228, serial port 230, short-range communications subsystem 240, or any other suitable subsystem 242, and installed by a user in RAM 226, or preferably the persistent store 224, for execution by the microprocessor 238. Such flexibility in application installation increases the functionality of the mobile device 102 and may provide enhanced on-device features, communication-related features or both.

The display 222 is used to visually present an application's graphical user interface (GUI) on the mobile device 102. Application data can be manipulated by modifying information on the GUI using an input device such as the keyboard 232 for example. Depending on the type of mobile device 102, the user may have access to other types of input devices, such as, for example, a scroll wheel, trackball, light pen or touch sensitive screen (e.g. a touchscreen).

Location-based applications executing on the mobile device 102 use positioning information from the positioning device 244 to provide relevant information to the user, often in real-time. The positioning device 244 may be a GPS receiver for receiving satellite broadcasts. In one embodiment, the satellite broadcast data is used by the mobile device 102 to determine its position. In another embodiment, the satellite broadcast data is transmitted from the mobile device 102 to one of the network servers 108 to determine the position of the mobile device 102.

Alternatively, the positioning device 244 may be a positioning module for receiving positioning information from one of the network servers 108. in this embodiment, the positioning module may comprise a software solution, rather than a hardware solution.

Figure 3:
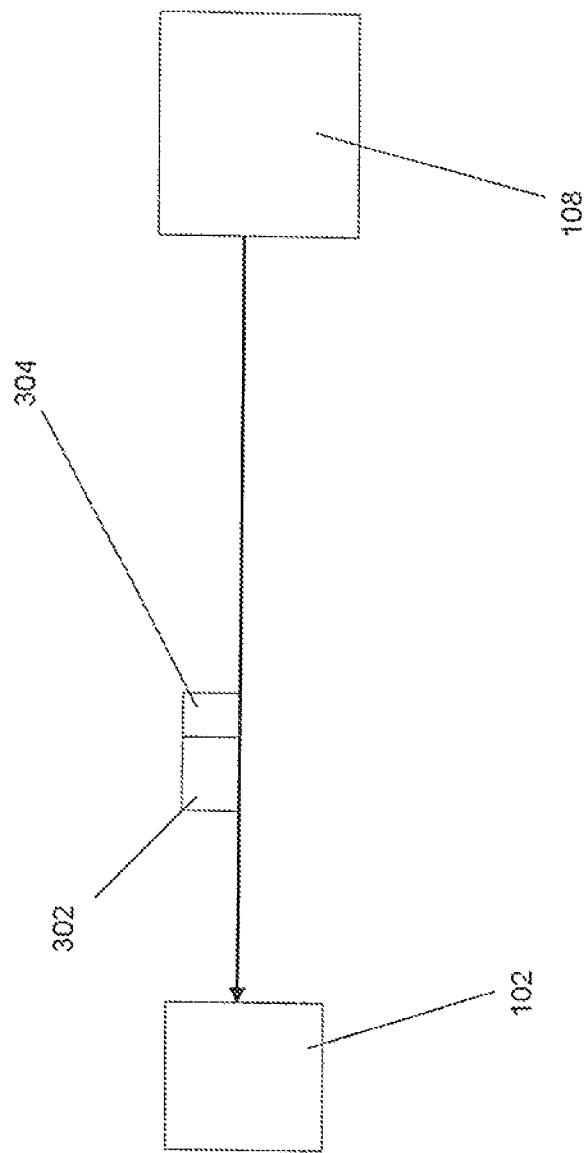
FIG. 3 is a block diagram illustrating secondary content and a controller being communicated from a server to a mobile device.

Data (e.g. primary content or secondary content) can be transmitted from one or more servers 108 to a mobile device 102. FIG. 3 shows the server 108 transmitting or communicating secondary content 302 and a controller 304 to the mobile device 102, according to an embodiment. This communication between the server 108 and mobile device 102 can be over the communication network 106, for example. Secondary content 302 comprises content not specifically requested at the mobile device 102 such as advertisements, coupons, contests, etc. The server 108 can be, for example, an advertisement server that compiles advertisements that may be targeted to content or information stored on the mobile device 102 and that communicates these advertisements to the mobile device 102. The controller 304 is associated with the secondary content 302 and is displayed on the interface of the mobile device 102 in order to indicate the presence of the secondary content 302.

According to an alternative embodiment, the controller 304 originates or is generated on the mobile device 102 rather than being transmitted by the server 108 to the mobile device. Instead, only the secondary content 302 is transmitted by the server 108 to the mobile device 102.

The secondary content 302 is a member of one of a plurality of content categories. Each content category defines a set of secondary content 302 that is of a specific type. The types of secondary content 302 defined in each content category can comprise advertisements, coupons, contests and subscriptions, for example.

Figure 4:
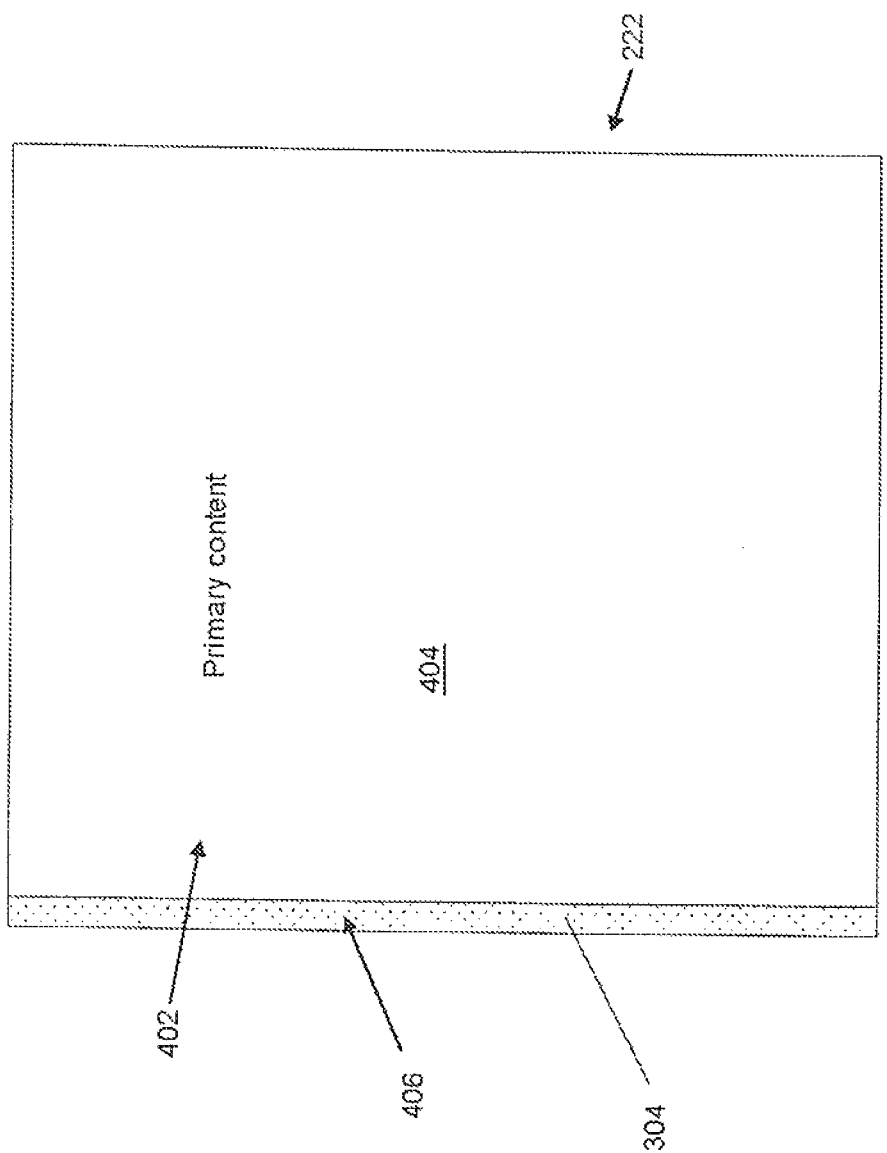
FIG. 4 is a schematic diagram illustrating an interface of a mobile device having primary content displayed thereon.

FIG. 4 is a schematic diagram depicting an interface 404 on the display 222 of the mobile device 102. Primary content 402 and the controller 304 are displayed on the interface 404. The primary content 402 can be a messaging program such as email, a game application or other types of applications such as a web browser or word processing application, for example. Other examples of primary content 402 will be familiar to skilled persons. Typically, primary content 402 is initiated through input into the mobile device 102. Primary content 402 can also be communicated over the communications network 106 to the mobile device 102, for example. Alternatively, the primary content 402 can be communicated to the mobile device 102 from a different server 108 from which the secondary content 302 is communicated.

The controller 304 has a visual property 406 that identifies one of the plurality of content categories. Specifically, the visual property 406 identifies the content category that the secondary content 302 is a member of. For example, the visual property 406 can be a colour or a pattern that is associated with a particular content category. The visual property 406 can comprise one of a plurality of colours, with each of the plurality of colours identifying a specific content category. For example, a blue visual property 406 can be associated with the content category that includes the coupons type of secondary content 302. Optionally, there may be a menu interface (not shown) that displays a legend outlining which visually properties 406 identify which content categories.

According to an embodiment, the visual property 406 can be applied to the controller 304 at the mobile device 102. The mobile device 102 receives the secondary content 302 (e.g.

from the server 108) and determines the content category of the secondary content 302. The mobile device 102 can receive the secondary content 302 before applying the visual property 406 to the controller 304. The determination of the content category of the secondary content 302 can be undertaken based on the contents of the secondary content 302. For example, the content category of the secondary content 302 can be indicated using a flag set in the meta data. Alternatively, the flag can be communicated from the server 108 to the mobile device 102 separately from the secondary content 302. By way of further example, the content category of the secondary content 302 can be determined from other content of the mete data associated with the secondary content 302. There may be a field in the meta data that identifies the content type. The mobile device 102 can have an application that automatically parses the fields in the meta data of received secondary content 302 in order to determine the content category. After the content category is determined the visual property 406 of the controller 304 can be mapped to a pre-set visual property 405 (e.g. a specific colour) based on the determined content category.

The mobile device 102 can have a filter that is applied to the received secondary content 302 that blocks certain categories of secondary content 302 and its associated controller 304 from being displayed on the interface 404. The filter can be an application operating on the mobile device 102, for example. The filter can be configured to block secondary content 302 that is a member of a prohibited content category from being displayed on the mobile device 102. The prohibited content categories can be adjusted or specified through input into the mobile device 102. For example, the prohibited content categories can comprise a list of content categories that is set or adjusted by input into the mobile device. By way of further example, the prohibited content categories can comprise a pre-determined list of content categories. Further, the controller 304 that is associated with prohibited secondary content 302 is also prohibited from being displayed on the mobile device 102 by the operation of the filter.

The controller 304 shown in FIG. 3 has a visual property 406 that is a dotted pattern and occupies an edge of interface 404. The controller 304 and its visual property 406 are displayed on interface 404 such that the primary content 402 controller 304 does not visually interfere with the primary content 402 on the interface 404. In other words, the primary content 402 remains visible along with the controller 304 on the interface 404 and the controller 304 does not distract from the visibility of the primary content 402 on the interface 404. For example, the controller 304 can be translucent, flashing, small or located on the edge of the display 222 screen. The mobile device 102 can receive input to select the controller 304. For example, input can be received via a keyboard, trackball, touchscreen display or other I/O component. By way of further example, the input can be a finger swipe or slide on a touchscreen in the direction of the controller 304.

When the controller 304 is selected through input received on the mobile device 102, the secondary content 302 associated with the selected controller 304 is displayed on the interface 404. The secondary content 302 can be displayed in a separate window or frame on interface 404 of the mobile device 102. Thus, a mere glance at the primary content 402 and controller 304 on interface 404 can be enough to determine the type of secondary content 302 that is available for viewing.

FIG. 5 is a schematic diagram showing secondary content 302 on interface 404 of the display 222. A cancel control 502 shown as an 'X' in a box is in the top corner of interface 404. The cancel control 502 is a selectable virtual button that closes the secondary content 302 from interface 404. When the secondary content 302 is closed (e.g. by selecting the cancel button 502), the primary content 402 is shown on interface 404.

According to an embodiment, the secondary content 302 is one of an advertisement, coupon, contest or subscription form. The secondary content 302 can have interactive elements, such as virtual buttons or data entry fields. For example, the secondary content 302 can be a contest entry form with tillable data entry fields that can be filled in with information (e.g. name, address, etc.) received through input into interface 404 of the mobile device 102 for entering the contest. By way of further example, the secondary content 302 comprises a choice between two different advertisements (e.g. an ad for a mini-van or for a sports car) one of which can be selected through input into interface 404.

The secondary content 302 can be targeted based on the primary content 402. For example, the primary content 402 can comprise text and the secondary content 302 can be advertising that is targeted to the primary content 402 based on the text of the primary content 402. The server 108 that communicates the secondary content 302 to the mobile device 102 may be in communication with the mobile device 102 or another server 108 that serves the primary content 402 in order to access the text in the primary content 402. In this way the server 108 is aware of the primary content 402 so that the server 108 or another application can use the primary content 402 to target the secondary content 302 that is transmitted to the mobile device 102. By way of further example, the secondary content 302 can be targeted to the primary content 402 based on the location of the mobile device 102 or on the recent activity (e.g. recent input received or recently operated applications) on the mobile device 102.

FIG. 6 is a schematic diagram showing another embodiment of secondary content 302 that is displayed on interface 404 after input is received at the mobile device selecting the controller 304 associated with the secondary content 302. Secondary content 302 is shown on interface 404. A cancel control 502 and a return indicator 602 (i.e. another control) are also shown on interface 404. The return indicator 602 can be selected by user input. The return indicator 602 is a bar on the side of interface 404, It is recognized that the return indicator 602 can be another selectable icon or selectable item displayed on interface 404 or, alternatively, the return indicator 602 can be a key or virtual button. When the return indicator 602 is selected, the secondary content 302 is closed revealing the primary content 402 again. The return indicator 602 can be selected using input methods known to skilled persons such as a keyboard or touchscreen interface.

FIG. 7 is a schematic diagram of an embodiment of interface 404 of the display 222. The interface 404 of FIG. 7 shows the primary content 402, the controller 304 and a second controller 304b on interface 404. The controller 304 is shown as a bar on one edge of interface 404 and the second controller 304b is shown as a bar on the opposite edge of interface 404. The primary content 402 is still visible along with the controller 304 and second controller 304b. The controller 304 and second controller 304b do not interfere with the visibility of the primary content 402. The second controller 304b is associated with an alternative secondary content (not shown). The second controller 304b provides the same functionality as the controller 304. When input is received selecting the second controller 304b, the alternative secondary content is displayed on interface 404.

The controller 304 has a visual property 406 that is blue and the second controller 304h has a visual property 406 that is green. The blue colour identifies the content category of the secondary content 302. The green colour identifies the content category of the alternative secondary content. For example, green indicates that the secondary content 302 is in the content category of advertisements that contain free coupons. When the controller 304 with a green virtual property 406 is selected an advertisement containing a free coupon appears on interface 404. By way of further example, the blue colour of the second controller 304b identifies the category of a contest. When input is received selecting the second controller 304b a contest appears on interface 404. Further examples of visual properties identifying content categories are as follows: red identifies a content category of subscription forms; and black identifies a content category of a cashback advertisement.

According to the embodiment shown in FIG. 7, interface 404 is a touchscreen interface and the controllers 304, 304b are selectable using a finger swipe. A finger 702, a right arrow 704 and a left arrow 706 are shown for demonstrative purposes. The finger 702 can swipe on interface 404 in the direction of the left arrow 706 in order to select the controller 304. The finger 702 can swipe on interface 404 in the direction of the right arrow 704 in order to select the second controller 304b.

Operation

A flow chart showing a method of providing secondary content 302 and controllers 304 is depicted at 800 in FIG. 8. More specifically, the method is for providing secondary content 302 on a mobile device 102 with the secondary content 302 associated with a controller 304 and the secondary content 302 being a member of one of a plurality of content categories.

At step 802, the primary content 402 is displayed on an interface 404 of the mobile device 102. The primary content 402 can be requested (e.g. downloaded) from a remote server 108 by the mobile device 102 over the communication network 106, for example.

At step 804, the secondary content 302 is received at the mobile device 102 from the server 108. The server 108 that communicates the secondary content 302 to the mobile device 102 is not necessarily the same server 108 that communicates primary content 402 to the mobile device 102. The controller 304 associated with the secondary content 302 may be communicated to the mobile device 102 as well, Alternatively, the controller 304 may be generated at the mobile device 102.

At step 806, the visual property 406 is applied to the controller 304. The visual property 406 is for identifying the content category that the secondary content 302 is a member of. The visual property 406 of the controller 304 may also be communicated to the mobile device 102 from the server 108 along with the controller 304. Alternatively the visual property 406 may be applied to the controller 304 associated with the secondary content 302 on the mobile device 102. For example, the visual property may be applied to the controller 304 in accordance with preferences or flags set on the mobile device 102. The preferences can comprise filters on the mobile device 102 that are applied to the meta data in the secondary content 302, for example. The preferences for the visual properties 406 for one or more content categories can be set or adjusted through input into the mobile device 102. For example, the visual property 406 such as the colour green can be associated on the mobile device with the content category of coupons. Thus, when secondary content 302 that is in the content category of coupons is received at the mobile device 102, the controller 304 applied to that secondary content 302 will have the visual property 406 of the colour green applied to it.

At step 808, after receiving the secondary content 302 at the mobile device 102, the controller 304 is displayed on the interface 404 of the mobile device 102 such that the controller 304 does not visually interfere with the primary content 402. The controller 304 includes a visual property 406 identifying the content category of which the secondary content 302 is a member. For example, the controller 304 may be located on the interface 404 in a position that allows a user to still view the content of the primary content 402.

At step 810, input is received at the mobile device 102 selecting the controller 304. The input can be received through a touchscreen interface, for example. The input can be a finger swipe in the direction of the controller 304 on the touchscreen interface, for example.

At step 812, in response to receiving the input, the secondary content 302 associated with the controller 304 is displayed on the interface 404 of the mobile device 102. The secondary content 302 may be displayed in a pop-up window on interface 404, for example. It is recognized that more than one controller 304, 304b can be simultaneously displayed on interface 404 of the mobile device 102 with each controller 304, 304b associated with distinct secondary content 302.

FIG. 9 is a flowchart depicting at 900 additional optional steps to the method of providing secondary content 302 and controllers 304 on a mobile device 102. At step 902, a filter operating on the mobile device 102 determines whether the content category of the secondary content 302 is a prohibited content category. If the content category is a prohibited content category then, at step 904, the controller 304 is blocked from being displayed on the interface 404 of the mobile device 102.

One or more currently preferred embodiments have been described by way of example. It will be apparent to persons skilled in the art that a number of variations and modifications can be made without departing from the scope of what is defined in the claims.

What is claimed is:

1. A method of displaying two or more instances of secondary content on a mobile device, each instance of secondary content being a member of one of a plurality of content categories, the method comprising:

displaying primary content on an interface of the mobile device;

receiving the two or more instances of secondary content at the mobile device;

determining a content category for each instance of the two or more instances of secondary content;

applying a visual property to two or more controllers, each of the two or more controllers associated with and visually indicating a presence of a respective one of the two or more instances of secondary content, the visual property based on the determined content category and each of the two or more controllers configured to display the respective one of the two or more instances of secondary content when selected;

displaying each instance of the two or more controllers on the interface of the mobile device such that each of the two or more controllers does not visually interfere with the displayed primary content and such that each of the two or more instances of secondary content is not displayed; and in response to receiving an input selecting a one of the two or more controllers, displaying the instance of secondary content associated with the one of the two or more controllers on the interface of the mobile device.

2. The method of claim 1 wherein the step of applying the visual property occurs after the step of receiving the two or more instances of secondary content at the mobile device.

3. The method of claim 2 wherein the visual property is automatically applied to each controller based on the contents of the associated secondary content.

4. The method of claim 2 wherein the visual property is manually selected for applying to each controller.

5. The method of claim 1 wherein the visual property comprises a one of a plurality of colours, each of the plurality of colours identifying a specific content category.

6. The method of claim 1 wherein each of the two or more instances of secondary content is one of an advertisement, a coupon, a contest or a subscription form.

7. The method of claim 1 wherein each of the two or more controllers is a bar on an edge of the interface of the mobile device.

8. The method of claim 1 wherein the content categories comprise advertisements, coupons, contests and subscriptions.

9. The method of claim 1 wherein the primary content is one of an electronic message, an image, a game or a web page.

10. The method of claim 1 further comprising:
   determining whether the content category of each of the two or more instances of secondary content is a prohibited content category; and
   wherein if the content category of one of the two or more instances of secondary content is a prohibited content category then the controller associated with the one of the two or more instances of secondary content is blocked from being displayed on the interface of the mobile device.

11. The method of claim 10 wherein the determination of whether the content category of each of the two or more instances of secondary content is a prohibited content category comprises comparing the content category to a predefined list of prohibited content categories.

12. The method of claim 1 wherein each of the two or more instances of secondary content is targeted based on the primary content.

13. A mobile device having a processor and memory, the memory storing instructions and data for execution by the processor to configure the device to:
   display primary content on an interface of the mobile device;
   receive two or more instances of secondary content at the mobile device;
   determine a content category for each instance of the two or more instances of secondary content;
   apply a visual property to two or more controllers, each of the two or more controllers associated with and visually indicating a presence of a respective one of the two or more instances of secondary content, the visual property based on the determined content category and each of the two or more controllers configured to display the respective one of the two or more instances of secondary content when selected;
   display each instance of the two or more controllers on the interface of the mobile device such that each of the two or more controllers does not visually interfere with the displayed primary content and such that each of the two or more instances of secondary content is not displayed; and
   in response to receiving an input selecting a one of the two or more controllers, display the instance of secondary content associated with the one of the two or more controllers on the interface of the mobile device.

14. The mobile device of claim 13 wherein the visual property is applied after the two or more instances of secondary content are received at the mobile device.

15. The mobile device of claim 14 wherein the visual property is automatically applied to each controller based on the contents of the associated secondary content.

16. The mobile device of claim 14 wherein the visual property is manually selected for applying to each controller.

17. The mobile device of claim 13 wherein the visual property comprises a one of a plurality of colours, each of the plurality of colours identifying a specific content category.

18. The mobile device of claim 13 wherein each of the two or more instances of secondary content is one of an advertisement, a coupon, a contest or a subscription form.

19. The mobile device of claim 13 wherein each of the two or more controllers is a bar on an edge of the interface of the mobile device.

20. The mobile device of claim 13 wherein the content categories comprise advertisements, coupons, contests and subscriptions.

21. The mobile device of claim 13 wherein the primary content is one of an electronic message, an image, a game or a web page.

22. The mobile device of claim 13 wherein the mobile device is further configured to:
   determine whether the content category of each of the two or more instances of secondary content is a prohibited content category; and
   wherein if the content category of one of the two or more instances of secondary content is a prohibited content category then the controller associated with the one of the two or more instances of secondary content is blocked from being displayed on the interface of the mobile device.

23. The mobile device of claim 22 wherein the determination of whether the content category of each of the two or more instances of secondary content is a prohibited content category comprises comparing the content category to a predefined list of prohibited content categories.

24. The mobile device of claim 13 wherein each of the two or more instances of secondary content is targeted based on the primary content.

25. A non-transitory computer readable medium having computer readable code embodied therein for execution by a processor for configuring a mobile device to carry out a method of providing two or more instances of secondary content on a mobile device, each instance of secondary content being a member of one of a plurality of content categories, the method comprising:
   displaying primary content on an interface of the mobile device;
   receiving the two or more instances of secondary content at the mobile device;
   determining a content category for each instance of the two or more instances of secondary content;
   applying a visual property to two or more controllers, each of the two or more controllers associated with and visually indicating a presence of a respective one of the two or more instances of secondary content, the visual property based on the determined content category and each of the two or more controllers configured to display the respective one of the two or more instances of secondary content when selected;
   displaying each instance of the two or more controllers on the interface of the mobile device such that each of the two or more controllers does not visually interfere with the displayed primary content and such that each of the two or more instances of secondary content is not displayed; and in response to receiving an input selecting a one of the two or more controllers, displaying the instance of secondary content associated with the one of the two or more controllers on the interface of the mobile device.

* * * * *